(12) United States Patent
Lai et al.

(10) Patent No.: US 9,344,834 B2
(45) Date of Patent: May 17, 2016

(54) COMMUNICATION METHOD IN WIRELESS ACCESS NETWORK AND WIRELESS ACCESS NETWORK DEVICE

(71) Applicant: ZTE CORPORATION, Shenzhen, Guangdong Province (CN)

(72) Inventors: Hong Lai, Shenzhen (CN); Zhixiong Zhou, Shenzhen (CN); Jun Huang, Shenzhen (CN); Zhuo Cui, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/421,852

(22) PCT Filed: Aug. 5, 2013

(86) PCT No.: PCT/CN2013/080808
§ 371 (c)(1),
(2) Date: Feb. 16, 2015

(87) PCT Pub. No.: WO2013/185720
PCT Pub. Date: Dec. 19, 2013

(65) Prior Publication Data
US 2015/0223007 A1  Aug. 6, 2015

(30) Foreign Application Priority Data

Aug. 29, 2012  (CN) .......................... 2012 1 0312311

(51) Int. Cl.
*H04W 4/00* (2009.01)
*H04W 4/20* (2009.01)
(Continued)

(52) U.S. Cl.
CPC ........... *H04W 4/003* (2013.01); *H04L 12/4633* (2013.01); *H04L 61/103* (2013.01);
(Continued)

(58) Field of Classification Search
CPC ..... H04W 8/245; H04W 24/02; H04W 88/02; H04W 4/003; H04W 4/20; H04W 4/12; H04M 1/72525; H04M 1/72522; H04L 67/2804; H04L 67/20; H04L 61/103; H04L 61/6013; H04L 61/1511; H04L 61/35; H04L 12/4633
See application file for complete search history.

(56) References Cited

U.S. PATENT DOCUMENTS

2007/0067385 A1\* 3/2007 D'Angelo ............... H04L 67/02
709/203
2010/0034218 A1  2/2010 Kovvali et al.
(Continued)

FOREIGN PATENT DOCUMENTS

| CN | 101159923 A | 4/2008 |
|---|---|---|
| CN | 103067428 A | 4/2013 |
| CN | 103167637 A | 6/2013 |
| WO | 2012018824 A1 | 2/2012 |

*Primary Examiner* — Ted Wang
(74) *Attorney, Agent, or Firm* — Ling Wu; Stephen Yang; Ling and Yang Intellectual Property (57) ABSTRACT

A communication method in a wireless access network and a wireless access network device are provided. The communication method comprises: setting a third-party application platform for processing a third-party application request of a user equipment (UE) in the wireless access network; the third-party application platform monitoring an uplink message from the UE, parsing and determining whether the uplink message is an uplink third-party application message; the third-party application platform performing local processing on the uplink third-party application message using a third-party application program of the third-party application platform when determining the uplink message is the third-party application message. In the embodiments of the present document, the number of nodes and a distance traveled by the data traffic transmitted in a network can be reduced, the uplink and downlink traffic of the base station egress can be reduced, and the user experience and network efficiency can be improved.

8 Claims, 3 Drawing Sheets

(51) Int. Cl.
  *H04L 29/08* (2006.01)
  *H04L 29/12* (2006.01)
  *H04W 4/12* (2009.01)
  *H04L 12/46* (2006.01)
(52) U.S. Cl.
  CPC ............ *H04L61/6013* (2013.01); *H04L 67/20* (2013.01); *H04L 67/2804* (2013.01); *H04W 4/12* (2013.01); *H04W 4/20* (2013.01); *H04L 61/1511* (2013.01); *H04L 61/35* (2013.01)

(56) References Cited

U.S. PATENT DOCUMENTS

| | | |
|---|---|---|
| 2012/0064908 A1 | 3/2012 | Fox et al. |
| 2013/0060679 A1* | 3/2013 | Oskolkov ............... G06Q 20/02 705/39 |
| 2013/0144762 A1* | 6/2013 | Nguyen ............. G06Q 30/0635 705/26.81 |

\* cited by examiner

| Information name/information number |
| --- |
| Third-party application serial number |
| Third-party application server URL |
| Public network IP address of a third-party application server |
| Port number of a third-party application server |
| Uplink third-party application and server traffic |
| Downlink third-party application and server traffic |
| Uplink third-party application and UE traffic |
| Downlink third-party application and UE traffic |

COMMUNICATION METHOD IN WIRELESS ACCESS NETWORK AND WIRELESS ACCESS NETWORK DEVICE

TECHNICAL FIELD

The present document relates to communication and base station technology and especially, to third-party application technology of wireless access network.

BACKGROUND OF THE RELATED ART

With the development of mobile communication technology and with the increased popularity of smart phones, data traffic in the wireless communication system is showing a rapid growth trend. In fact the base station is actually a dump pipe. The base station, as a simple data forwarding node, neither distinguishes the type of users, the type of user equipment and the type of services, nor has the ability of localization storage and data optimization. The rapid growth of data traffic, real-time requirements of game data, large-scale application of video data, and large-scale application of M2M (Machine-to-Machine) have a big impact on base station backhaul and core network.

SUMMARY

Embodiments of the present document provide a third-party application platform in a wireless access network and a communication method thereof. A wireless access device is enabled to process context data of a UE by third-party application software residing in the wireless access network, which reduces the uplink and downlink traffics of a device egress.

Embodiments of the present document provide a communication method of a third-party application platform in a wireless access network, comprising:

setting a third-party application platform for processing a third-party application request of a user equipment (UE) in the wireless access network;

the third-party application platform monitoring an uplink messages from the UE, parsing and determining whether the uplink message is an uplink third-party application message;

the third-party application platform performing local processing on the uplink third-party application message using a third-party application program of the third-party application platform when determining that the uplink message is the third-party application message.

Alternatively, the step of the third-party application platform parsing and determining whether the uplink message is an uplink third-party application message comprises:

the third-party application platform searching a third-party application information structure table of the third-party application platform according to a destination Internet Protocol IP address and a destination port number of the uplink message, and determining whether the message is the uplink third-party application message according to searching results.

Alternatively, the method further comprises:

the third-party application platform sending an uplink third-party application Domain Name System (DNS) message to a DNS server through a third-party application proxy server set in the wireless access network; and receiving downlink a third-party application DNS response message which is responded by the DNS server; and the third-party application platform finding a third-party application server which needs to perform interaction using the downlink third-party application DNS response message.

Alternatively, the method further comprises:

the third-party application platform sending an uplink third-party application Transmission Control Protocol/User Datagram Protocol (TCP/UDP) message to the third-party application server through the third-party application proxy server; and receiving and storing a downlink third-party application TCP/UDP message which is responded by the third-party application server.

Alternatively, the step of the third-party application platform sending an uplink third-party application Transmission Control Protocol/User Datagram Protocol TCP/UDP message to the third-party application server through the third-party application proxy server, comprises:

the third-party application platform encapsulating with an outer IP header for the uplink third-party application TCP/UDP message, sending to the third-party application proxy server the uplink third-party application TCP/UDP message after encapsulating; the third-party application proxy server stripping the outer IP header of the uplink third-party application TCP/UDP message, and after modifying an inner IP address of the outer IP header, sending the uplink third-party application TCP/UDP message to the third-party application server.

Alternatively, the method further comprises:

the third-party application proxy server encapsulating with an outer IP header for the downlink third-party application TCP/UDP message, sending to the third-party application platform the downlink third-party application TCP/UDP message after encapsulating; after stripping the outer IP header of the downlink third-party application TCP/UDP message, the third-party application platform sending the downlink third-party application TCP/UDP message to the third-party application program of the third-party application platform.

The embodiments of the present document further provide a wireless access device, comprising a third-party application platform which comprises a message parsing module and a third-party application program module; wherein:

the message parsing module is configured to: monitor an uplink message from a user equipment (UE); parse and determine whether the uplink message is an uplink third-party application message; and send the uplink message to the third-party application program module when determining that the uplink message is the third-party application message;

the third-party application program module is configured to: perform local processing on the uplink third-party application message using a third-party application program of the third-party application program module.

Alternatively, the wireless access device further comprises a message pre-processing module and a third-party application frame; wherein, the message pre-processing module is configured to: send the uplink third-party application message to the third-party application program module through the third-party application frame; and receive a downlink third-party application message which is responded by the third-party application program module through the third-party application frame, and send the downlink third-party application message to the message parsing module;

the third-party application frame is configured to: forward the uplink third-party application message to the third-party application program module, and forward the downlink third-party application message to the message pre-processing module.

Alternatively, the third-party application program module is further configured to: send an uplink third-party application TCP/UDP message to a third-party application server through a third-party application proxy server set in the wireless access network; and receive and store a downlink third-party application TCP/UDP message which is responded by the third-party application server to the uplink third-party application TCP/UDP message.

Alternatively, the message pre-processing module is further configured to: receive the uplink third-party application TCP/UDP message through the third-party application frame; encapsulate with an outer IP header for the uplink third-party application TCP/UDP message, send to the third-party application proxy server the uplink third-party application TCP/UDP message after encapsulating; and after stripping an outer IP header of the downlink third-party application TCP/UDP message, send the downlink third-party application TCP/UDP message to the third-party application program module through the third-party application frame.

The beneficial efforts of the embodiments of the present document are as follows:

1. In the embodiments of the present document, by setting the third-party application platform at the base station side, the third-party application server is enabled to push data to the third-party application platform that resides in each base station;

2. In the embodiments of the present document, by the third-party application platform residing in the base station side, the base station side is enabled to process the context data of the UE, which reduces the number of nodes and a distance traveled by the data traffic transmitted in a network, reduces the uplink and downlink traffic of the base station egress, and improves an user experience and network efficiency of the increasing data service;

3. the applications on UEs and public network servers are consistent with an existing frame in the embodiments of the present document, and the wireless network frame is not required to modify and redesign, which greatly protects the operator's investment.

PREFERRED EMBODIMENTS OF THE INVENTION

The preferred embodiments in the present document are described in detail in combination with the figures. It should be understood that, without conflicts, the embodiments in the present application and features in the embodiments can be combined with each other arbitrarily.

Figure 1:
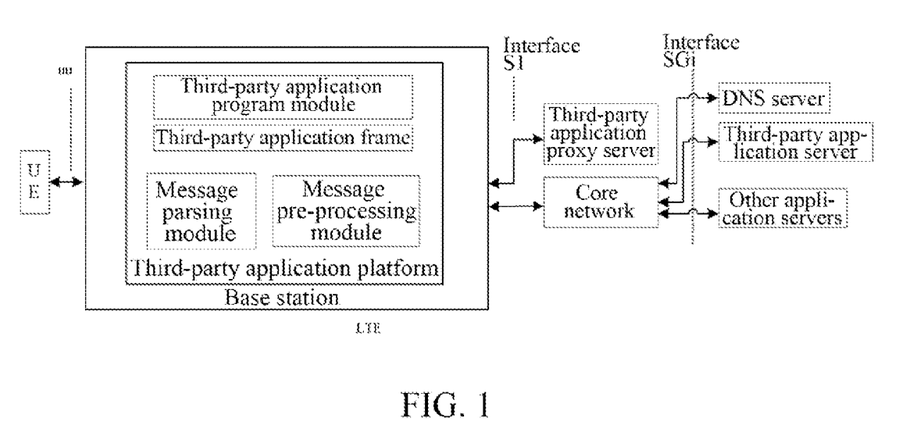
FIG. 1 is a structural diagram of a base station based on the third-party application, which is provided by a first embodiment of the present document.
Figure 2:
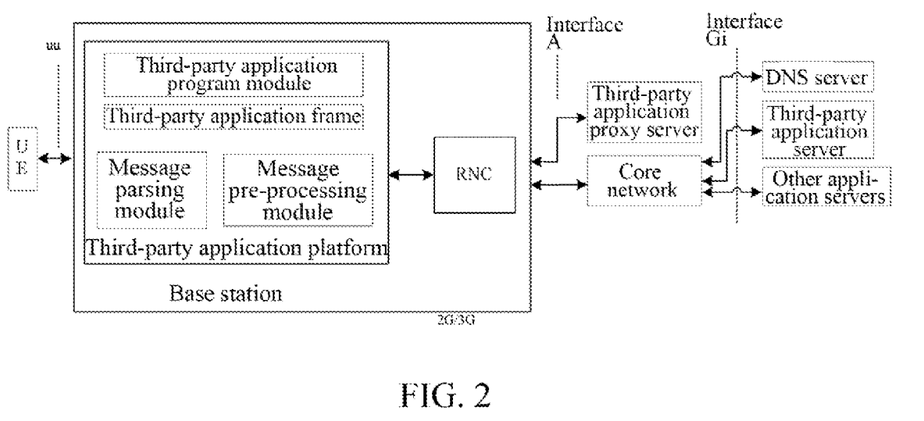
FIG. 2 is a structural diagram of a base station based on the third-party application, which is provided by a second embodiment of the present document.

The base station, based on the third-party application, supports 2G/3G/LTE (2nd Generation/3G/Long Term Evolution), wherein the third-party application refers to an application which is not developed by the telecom equipment provider and operator, such as software applications, QQ, UC and so on. FIG. 1 is a structural diagram of a base station based on the third-party application, which is provided by a first embodiment of the present document, namely, a structural diagram of a base station of LTE. FIG. 2 is a structural diagram of a base station based on the third-party application, which is provided by a second embodiment of the present document, i.e. a structural diagram of a base station of 2G/3G. The base station which is based on the third-party application is the same as a traditional base station, and simply requires to add the third-party application platform on the side of base station. For the base station of 2G/3G, processing for Packet Data Convergence Protocol (PDCP) layer is performed on Radio Network Controller (RNC), while the function of the RNC is moved down to the base station.

As shown in the FIGS. 1 and 2, in the embodiments of the present document, a third-party application platform is added within the base station, which is used to perform the local base station processing on uplink and downlink user data of the third-party application client of the UE, and is used to perform interaction of context data between the UE and the third-party application server in the public network through the third-party application platform. Meanwhile, the third-party application proxy server is added into the wireless access network, which is used to accomplish a communication between the third-party application platform which resides in the base station side and the third-party application server of the public network.

The third-party application platform comprises a third-party application program module (third-party application software executable documents), a third-party application frame, a message pre-processing module, and a message parsing module; wherein the message parsing module is responsible for parsing, classifying and identifying the message. The message pre-processing module is responsible for GPRS Tunneling Protocol User Plane (GTPU) parsing processing, IPinIP message processing, uplink and downlink statistics of the third-party application message, and message identifying.

The embodiment of the present document, taking an LTE base station as an example, is described and explained below, its principle also can be used for the base station of 2G/3G standard.

Figure 3:
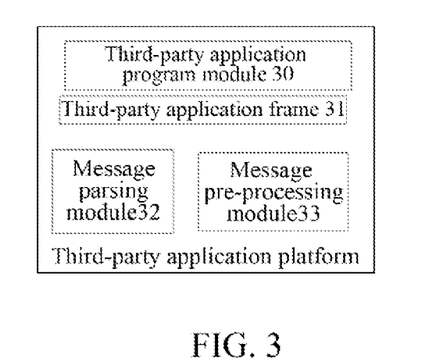
FIG. 3 is a structural diagram of the third-party application platform in the first and second embodiment of the present document.

FIG. 3 is a structural diagram of the third-party application platform in the first and second embodiments of the present document. The third-party application platform is set on the base station side, comprising a third-party application program module 30, a third-party application frame 31, a message parsing module 32 and a message pre-processing module 33.

The third-party application program module 30 is configured to: perform local processing on the uplink third-party application message using its third-party application program; and send the uplink third-party application TCP/UDP message to the third-party application server through third-party application proxy server set in the wireless access network; and receive and store the downlink third-party application TCP/UDP message which is responded by the third-party application server to the message. In other word, the third-party application program module 30 mainly manages context data in third-party application software clients in the UE, collectively uploads data to the third-party application server according to a storage condition of the local base station, and pre-downloads data from the third-party application server according to a requirement of the local base station, and performs a unified management on the third-party application software, comprising the functions such as configuration management, version management, alarm management and real-time monitoring and so on.

The third-party application frame 31 is configured to: forward the uplink third-party application message to the third-party application program module 30, and forward the downlink third-party application message to the message pre-processing module 33; and forward to the message pre-processing module 33 the uplink third-party application TCP/UDP message which is from the third-party application program module 30; and forward to the third-party application program module 30 the downlink third-party application TCP/UDP message of which an outer Internet Protocol (IP) header is stripped. The third-party application frame 31 provides the third-party application software with various function interfaces and callback functions, which achieves an interactive function between the third-party application program module 30 and the message pre-processing module 33.

The message pre-processing module 33 is configured to: send the uplink third-party application message, through the third-party application frame, to the third-party application program module 30; and receive the downlink third-party application message which is responded by the third-party application program module 30 through the third-party application frame to send to the message parsing module 32; and receive the uplink third-party application TCP/UDP message through the third-party application frame 31, send it to the third-party application proxy server by encapsulating with an outer IP header for the message; and strip the outer IP header of the downlink third-party application TCP/UDP message to send to the third-party application program module 30 through the third-party application frame 31. The message pre-processing module 33 identifies and takes statistics of the uplink and downlink messages between the UE and the third-party application program module 30; and identifies and takes statistics of uplink and downlink messages between the third-party application server and the third-party application program module 30. And wherein with respect to the uplink message between the third-party application server and the third-party application program module 30, a GTPU header is stored according to IP quintuple information, the payload of the message is sent to the third-party application program module 30. With respect to the downlink message between the UE and the third-party application program module 30, after searching for the GTPU header according to IP quintuple information, the found GTPU header is added to the message and sent to the UE.

The message parsing module 32 is configured to: monitor the uplink message from the UE; parse and determine whether the uplink messages is an uplink third-party application message; and send the uplink third-party application message to the third-party application program module 30 when determining the uplink message is the third-party application message. The message parsing module 32 mainly distinguishes the uplink and downlink messages between the UE and the third-party application program module 30, the uplink and downlink Domain Name System (DNS) messages between the UE and the third-party application program module 30, and the uplink and downlink messages of other media stream of the UE, and takes statistics of the uplink and downlink messages between the UE and the third-party application program module 30. The uplink and downlink messages between the UE and the third-party application program module 30 are sent to the message pre-processing module 33 to be processed; other messages are sent to a core network according to an existing workflow.

The workflow of the third-party application platform comprises the following steps:

With respect to the uplink message of the third-party application, the third-party application program module 30, through the third-party application frame 31, sends the uplink third-party application DNS message or TCP/UDP message; the third-party application frame 31 sends the message to the message pre-processing module 33; the message pre-processing module 33 constructs an IPinIP message, wherein a source IP address of the outer IP header is equal to an intranet IP address of a third-party application platform, a destination IP address is an intranet IP address of a third-party application proxy server. When a base station judges that the destination IP address is equal to the intranet IP address of the third-party application proxy server, the IPinIP message is sent to the third-party application proxy server. The third-party application proxy server sends the message to DNS server or third-party application server after stripping the outer IP header of the IPinIP message.

With respect to the downlink message of the third-party application, the DNS server or the third-party application server sends to the third-party application proxy server the downlink third-party application DNS response message or TCP/UDP message; the third-party application proxy server encapsulates with the outer IP header for the message to form the IPinIP message to send to the base station; when a destination IP address of the IPinIP message which is received by the base station is an intranet IP address of a third-party application platform, the message is forwarded to the third-party application platform; the message pre-processing module 33 of the third-party application platform, after stripping the outer IP header of the IPinIP message, sends the IPinIP message to the third-party application frame 31; the third-party application frame 31 then sends the message to the third-party application program module 30.

Figure 4:
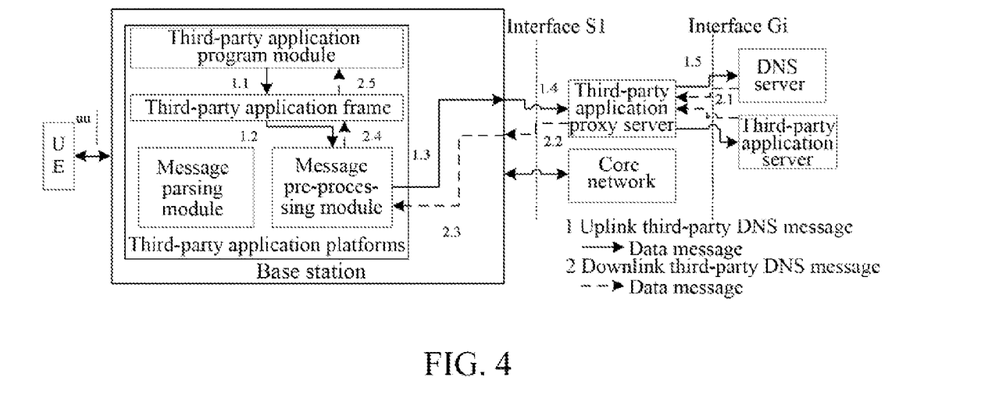
FIG. 4 is a flowchart of processing of uplink and downlink data of the third-party application on the base station side, which is provided by the first embodiment of the present document.

FIG. 4 is a flowchart of processing of uplink and downlink data of the third-party application on the base station side, which is provided by the first embodiment of the present document, i.e., a processing flowchart of uplink and downlink data of communication between third-party application platform and third-party application server in public network, wherein it describes a location of each module, and an interaction workflow of data therebetween. In FIG. 4, the UE, the third-party application server and the DNS server have extranet IP addresses (i.e., IP addresses in the public network); the third-party application program module has an intranet IP address; the third-party application proxy server has an extranet IP address and intranet IP address. The third-party application proxy server is responsible for the communication between the third-party application platform and DNS server and the third-party application server.

The uplink message sending workflow of the third-party application comprises the following steps:

In Step 1.1, the third-party application program module sends the uplink third-party application DNS message or TCP/UDP message to the third-party application frame.

With respect to the DNS message, the third-party application program module establishes sockets, at the same time, it sends the DNS message through the third-party application platform.

With respect to the data message, the third-party application program module sends the TCP/UDP message through the third-party application frame.

In Step 1.2, the third-party application platform sends the uplink third-party application DNS message, or TCP/UDP message to the message pre-processing module.

In Step 1.3, the message pre-processing module identifies the uplink third-party application DNS message, or TCP/UDP message.

Figure 5:
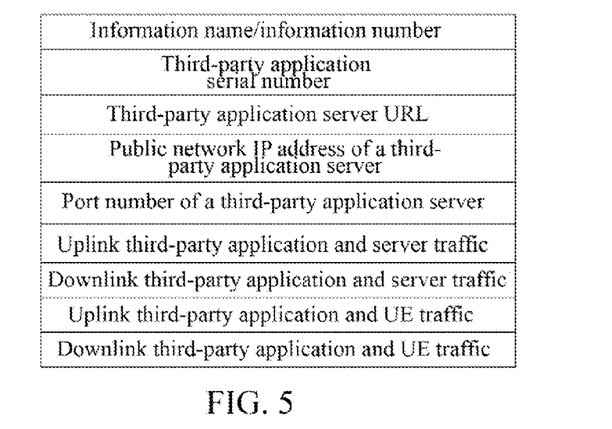
FIG. 5 is a schematic diagram of a third-party application information structure table which is provided by the first and second embodiment of the present document.

With respect to the uplink third-party application DNS message, a third-party application information structure table as shown in FIG. 5 is searched according to the destination IP address, traffic information of the uplink third-party application and server is updated. The IPinIP message is constructed, so that its source IP address of the outer IP header is an intranet IP address of a third-party application platform, and its destination IP address is an intranet IP address of a third-party application proxy server.

In Step 1.4, when a base station judges that the destination IP address of the IPinIP message is the intranet IP address of the third-party application proxy server, the IPinIP message is sent to the third-party application proxy server.

In Step 1.5, the third-party application proxy server strips the outer IP header of the IPinIP message; replaces an inner source IP address with an extra network IP address of the third-party application proxy server; replaces an inner destination IP address of the uplink third-party application DNS message with an extra network IP address of the DNS server; replaces an inner destination IP address of the uplink third-party application TCP/UDP message with an extra network IP address of the third-party application server; and sends the message to the DNS server or the third-party application server.

The receiving workflow of the downlink message of the third-party application comprises following steps:

In Step 2.1, the DNS server or the third-party application server sends to the third-party application proxy server the downlink third-party application DNS response message or TCP/UDP message.

In Step 2.2, the third-party application proxy server, after encapsulating with the outer IP header for the message, constructs the IPinIP message to be sent to a base station. A source IP address of the outer IP header is an intranet IP address of a third-party application proxy server, a destination IP address is an intranet IP address of a third-party application platform.

In Step 2.3, after receiving the message, the base station sends the message to the third-party application platform when judging that its destination IP address is an intranet IP address of the third-party application platform.

In Step 2.4, a message pre-processing module of the third-party application platform strips the outer IP header of the IPinIP message, and identifies whether the IPinIP message is a downlink third-party DNS message or downlink third-party TCP/UDP message. With respect to the downlink third-party DNS message, a third-party application server Uniform Resource Locater (URL) and the public network IP address of a third-party application server are searched according to the content of the message; a third-party application information structure table as shown in FIG. 5 is searched according to the URL information; the public network IP address of the third-party application server is updated to the structure table. With respect to the downlink third-party TCP/UDP message, the source IP address of the message is extracted to be an index of the public network IP address of the third-party application server; the third-party application information structure table has been searched, and traffic of the downlink third-party application and server is updated, then the message is sent to the third-party application frame.

In Step 2.5, the third-party application frame sends the messages to the third-party application program module.

Figure 6:
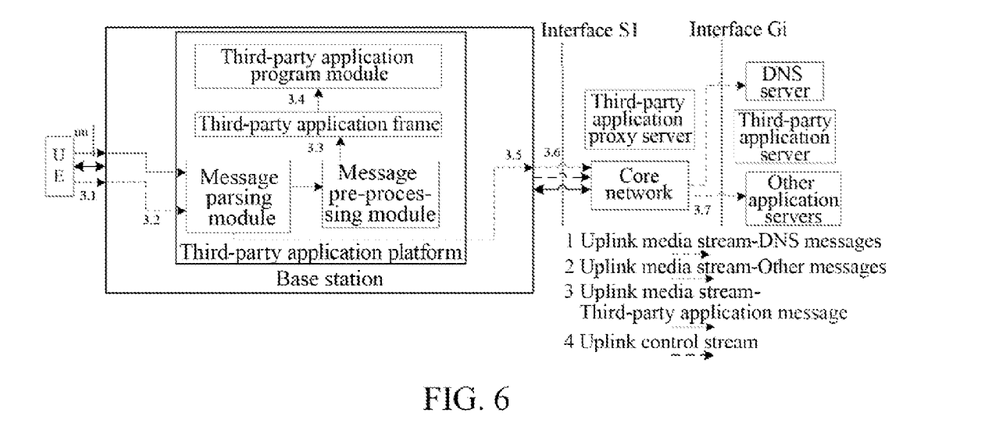
FIG. 6 is a flowchart of processing of uplink data of the UE provided by the first embodiment of the present document.

FIG. 6 is a flowchart of processing of uplink data of the UE provided by the first embodiment of the present document, comprising following steps:

In Step 3.1, the UE prepares the message according to different uplink message types, to send to the base station.

In Step 3.2, the base station forwards the received message to the third-party application platform.

The message parsing module of the third-party application platform firstly determines whether the message is an uplink control stream message or uplink media stream message, and extracts the quintuple data in the message. If the message is the uplink control stream message, then the message is sent directly to a primary control access module, and steps 3.5 and 3.6 are executed. If the message is the uplink media stream message, it is to look up a third-party application information structure table as shown in FIG. 5 according to a destination IP address of the message and a destination port number, judge whether the message is the uplink media stream third-party application message or not, when the message is the uplink media stream third-party application message, send it to the message pre-processing module. When the message is not the uplink media stream third-party application message, the message is directly sent to the primary control access module after stream statistics, stream identification and stream classification of the message are accomplished, and steps 3.5 and 3.6 are executed.

In Step 3.3, the message pre-processing module strips the GTPU header of the third-party application message of the uplink media stream, stores the GTPU header information according to quintuple information of the payload, and sends to the third-party application frame the message with the GTPU header being stripped.

In Step 3.4, the third-party application frame sends the message to the third-party application program module.

In Step 3.5, the base station forwards the message to a core network according to the existing workflow.

In step 3.6, the core network forwards the message to the DNS server and other application servers on the public network according to the existing workflow.

Figure 7:
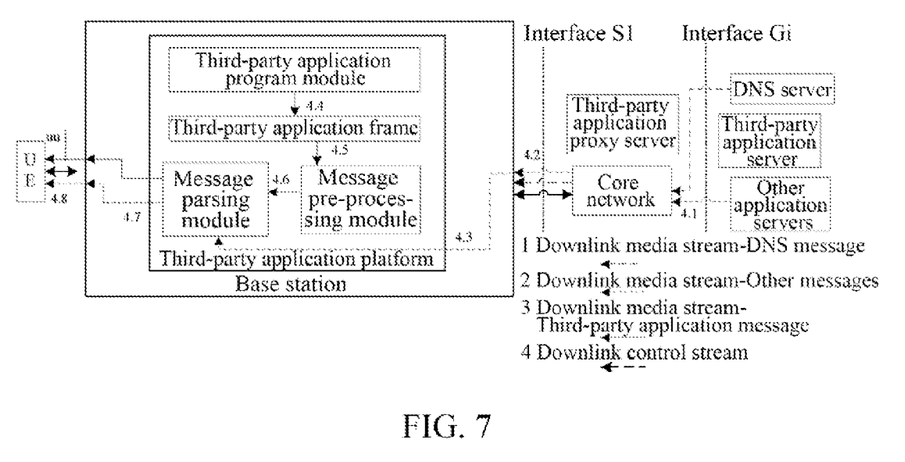
FIG. 7 is a flowchart of processing of downlink data of the UE provided by the first embodiment of the present document.

FIG. 7 is a flowchart of processing of downlink data of the UE provided by the first embodiment of the present document. The receiving workflow of the server response message comprises following steps:

In Step 4.1, the DNS server and other application servers on the public network send the DNS message and the other messages of the downlink media stream according to the existing workflow.

In Step 4.2, the core network forwards the other messages of the downlink media stream to the base station according to the existing workflow.

In Step 4.3, the base station forwards the other messages of the downlink media stream to the message parsing module of third-party application platform.

In Step 4.4, a third-party application program module sends the third-party application message of the downlink media stream to third-party application frame.

In Step 4.5, the third-party application frame sends the third-party application message of the downlink media stream to the message pre-processing module.

In Step 4.6, the message pre-processing module searches for the GTPU header according to quintuple information in the payload in the third-party application message of the downlink media stream, and encapsulates with the GTPU header, then sends to the message parsing module.

In Step 4.7, the message parsing module firstly judges whether the received message is a control stream message or media stream message.

The downlink control stream message is directly sent to the base station.

With respect to the downlink media stream message, a third-party application information structure table as shown in FIG. 5 is looked up according to a destination IP address of the message and a destination port number, whether the message is a third-party application message of the downlink media stream is determined. If the message is the third-party application message of the downlink media stream, then a statistics is made for the traffic of the UE and the downlink third-party application, and then the message is sent to the UE.

With respect to other messages of the downlink media stream, after stream statistics, stream identification and stream classification of the messages are accomplished, the messages are sent to the UE.

In Step 4.8, the base station sends the other messages of the downlink media stream to the UE.

In summary, in the embodiments of the present document, the third-party application platform residing in the base station side is used to process data of the third-party application software client of the UE, to store data pushed by the third-party application server, which largely reduces the egress traffic of the base station, reduces the number of nodes and a distance traveled by the data traffic transmitted in a network, and improves the user experience and network efficiency of the services.

Those ordinary skilled in the art should understand that the whole or part of steps of the above-mentioned method may be implemented by a program instructing relevant hardware, the program may be stored in a computer readable storage medium such as a read only memory, a disk or a compact disk. Alternatively, the whole or part of steps of the above-mentioned embodiments may also be implemented using one or more integrated circuits. Correspondingly, each module/unit in the above-mentioned embodiments may be implemented in a form of hardware, or may be implemented in a form of software function module. The embodiments of the present document are not limited to any specific form of the combination of hardware and software.

Although the embodiments of the present document are described in detail above, the present document is not limited thereto. A person skilled in the art can make various modifications according to the principle of the present document. Therefore, any modification made in accordance with the principle of the present document should be regarded as falling into the protection scope of the present document.

INDUSTRIAL APPLICABILITY

In the embodiments of the present document, the base station side can process the context data of the UE, which reduces the number of nodes and a distance traveled by the data traffic transmitted in a network, reduces the egress traffic of the base station, and improves an user experience and network efficiency of the increasing data service.

What we claim is:

1. A communication method in a wireless access network, comprising:
   setting a third-party application platform for processing a third-party application request of a user equipment (UE) in the wireless access network;
   the third-party application platform monitoring an uplink message from the UE, parsing and determining whether the uplink message is an uplink third-party application message;
   the third-party application platform performing local processing on the uplink third-party application message using a third-party application program of the third-party application platform when determining that the uplink message is the third-party application message; and
   the third-party application platform sending an uplink third-party application Domain Name System (DNS) message to a DNS server through a third-party application proxy server set in the wireless access network; and receiving a downlink third-party application DNS response message which is responded by the DNS server; and the third-party application platform finding a third-party application server which needs to perform interaction using the downlink third-party application DNS response message.

2. The method according to claim 1, wherein the step of the third-party application platform parsing and determining whether the uplink message is an uplink third-party application message comprises:
   the third-party application platform searching a third-party application information structure table of the third-party application platform according to a destination Internet Protocol (IP) address and a destination port number of the uplink message, and determining whether the message is the uplink third-party application message according to searching results.

3. The method according to claim 1, further comprising:
   the third-party application platform sending an uplink third-party application Transmission Control Protocol/User Datagram Protocol (TCP/UDP) message to the third-party application server through the third-party application proxy server; and receiving and storing a downlink third-party application TCP/UDP message which is responded by the third-party application server.

4. The method according to claim 3, wherein the step of the third-party application platform sending an uplink third-party application Transmission Control Protocol/User Datagram Protocol (TCP/UDP) message to the third-party application server through the third-party application proxy server, comprises:
   the third-party application platform encapsulating with an outer IP header for the uplink third-party application TCP/UDP message, sending to the third-party application proxy server the uplink third-party application TCP/UDP message after encapsulating; the third-party application proxy server stripping the outer IP header of the uplink third-party application TCP/UDP message, and after modifying an inner IP address of the outer IP header, sending the uplink third-party application TCP/UDP message to the third-party application server.

5. The method according to claim 4, further comprising:
   the third-party application proxy server encapsulating with an outer IP header for the downlink third-party application TCP/UDP message, sending to the third-party application platform the downlink third-party application TCP/UDP message after encapsulating; after stripping the outer IP header of the downlink third-party application TCP/UDP message, the third-party application platform sending the downlink third-party application TCP/UDP message to the third-party application program of the third-party application platform.

6. A wireless access device, comprising a third-party application platform which comprises a message parsing module, a third-party application program module, a message pre-processing module and a third-party application frame; wherein the message parsing module is configured to: monitor an uplink message from a user equipment (UE); parse and determine whether the uplink message is an uplink third-party application message; and send the uplink message to the third-party application program module when determining that the uplink message is the third-party application message;

the third-party application program module is configured to: perform local processing on the uplink third-party application message using a third-party application program of the third-party application program module;

the message pre-processing module is configured to: send the uplink third-party application message to the third-party application program module through the third-party application frame; and receive downlink third-party application message which is responded by the third-party application program module through the third-party application frame, and send the downlink third-party application message to the message parsing module;

the third-party application frame is configured to: forward the uplink third-party application message to the third-party application program module, and forward the downlink third-party application message to the message pre-processing module.

7. The wireless access device according to claim 6, wherein the third-party application program module is further configured to: send an uplink third-party application Transmission Control Protocol/User Datagram Protocol TCP/UDP message to a third-party application server through a third-party application proxy server set in the wireless access network; and receive and store a downlink third-party application TCP/UDP message which is responded by the third-party application server to the uplink third-party application TCP/UDP message.

8. The wireless access device according to claim 7, wherein the message pre-processing module is further configured to: receive the uplink third-party application TCP/UDP message through the third-party application frame; encapsulate with an outer IP header for the uplink third-party application TCP/UDP message, send to the third-party application proxy server the uplink third-party application TCP/UDP message after encapsulating; and after stripping an outer IP header of the downlink third-party application TCP/UDP message, send the downlink third-party application TCP/UDP message to the third-party application program module through the third-party application frame.

* * * * *